UNITED STATES PATENT OFFICE

CONWAY, FREIHERR v. GIRSEWALD AND HANS WEIDMANN, OF FRANKFORT-ON-THE-MAIN, GERMANY, ASSIGNORS TO AMERICAN LURGI CORPORATION, OF NEW YORK, N. Y., A CORPORATION OF NEW YORK

PRODUCTION OF ALKALI PHOSPHATES FROM METAL-PHOSPHORUS ALLOYS

No Drawing. Application filed October 30, 1929, Serial No. 403,649, and in Germany November 2, 1928.

This invention relates to the production of valuable compounds of phosphorus, such as alkali metal phosphates, from alloys of phosphorus with metals such as iron, manganese, copper and the like.

It has already been proposed to decompose ferro-phosphorus with sodium carbonate in a fused condition. Thus, for example, it has been proposed to stamp sodium carbonate into the bottom of a Bessemer converter and to allow ferro-phosphorus to flow in a molten condition into the converter, whereby a violent reaction takes place and a melt is produced, the lower portion of which consists of fluid iron and the upper portion of fluid sodium phosphate, which latter can be separated from the iron by tapping.

This process has the disadvantage that during the interaction at high temperature between the large amount of the reaction components in a fused state, it is impossible in practice, particularly when employing alloys rich in phosphorus, such as for example ferro-phosphorus containing 24% P, to conduct the highly exothermic reaction in such a manner that too violent or even explosive reaction phenomena are avoided. Moreover the furnace walls are subjected to extremely high wear and tear by contact with the molten mass. Finally, it is necessary to comminute the melt obtained, after cooling for the purpose of lixiviating it.

According to the present invention, these disadvantages are avoided by causing a mixture of the metal phosphorus alloy, especially ferro-phosphorus, with an alkaline alkali metal compound, for example with an alkali carbonate, such as sodium carbonate, to react at elevated temperatures, for example, from 600° C. upward, but avoiding such temperatures at which fusion of the material takes place by blowing in a very abundant amount of air, preferably while moving the material, for example, in a rotary tube furnace. In this manner it is possible, by suitably controlling the supply of heat, to so regulate the reaction that too violent a reaction is avoided. Moreover, the material of the furnace is protected to a great extent.

Finally, the reaction product is obtained in a form in which it can be immediately lixiviated for the purpose of recovering the alkali metal phosphate formed without requiring previous comminution.

By employing for example sodium carbonate the reaction is carried out after the following equation:

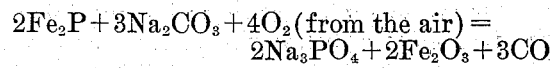
$$2Fe_2P + 3Na_2CO_3 + 4O_2 \text{(from the air)} = 2Na_3PO_4 + 2Fe_2O_3 + 3CO$$

The carbon monoxide generated at first is oxidized to carbon dioxide by the abundant amount of air present.

Leaching the roasted product furnishes a solution of tertiary sodium phosphate practically free from troublesome iron, while ferric oxide ($Fe_2O_3$) is obtained as residue. Sodium phosphate can be recovered from the solution by the usual methods and the ferric oxide can be returned to the process for generating fresh ferro-phosphorus in known manner per se by reacting a mineral phosphate, for example tricalciumphosphate, with the said ferric oxide in the presence of carbonaceous material.

Example

A mixture of 100 kgs. of finely ground ferro-phosphorus (containing 20% of phosphorus) with 110 kgs. of calcined sodium carbonate is passed through a rotary tube furnace, heated first to a temperature below 700° C. by a blast flame in the usual manner, care being taken by regulating the flame and blowing in a very abundant amount of air to prevent fusion of the mass, the temperature during the reaction thus not exceeding 900° C. in the hottest part of the tube.

The reaction product is leached with water while still hot. The liquor is practically free from iron and contains only tertiary sodium phosphate and a small amount of surplus sodium carbonate. The tertiary sodium phosphate can be recovered, in a state of extreme purity, by evaporation. The mother liquor serves for leaching a fresh batch of treated products. The residue from the leaching process, which contains a little phosphorus, consists of ferric oxide, which serves to decompose a fresh charge of phosphatic material.

We claim:

1. Process for the production of compounds containing the radicle of phosphoric acid by the aid of metal-phosphorus alloys, which comprises heating a metal phosphorus alloy with an alkaline alkali metal compound in the presence of oxygen in amount sufficient to oxidize all of the metal of the phosphorus alloy to oxide and at a reacting temperature below the fusion temperature of the reaction mixture and maintaining the temperature below the fusion point of the mixture, by blowing in a very abundant amount of air.

2. Process for the production of trialkali phosphate by the aid of metal-phosphorus alloys, which comprises heating a metal phosphorus alloy with an alkaline alkali metal compound in the presence of oxygen in amount sufficient to oxidize all of the metal of the phosphorus alloy to oxide and at a reacting temperature below the fusion temperature of the reaction mixture and maintaining the temperature below the fusion point of the mixture, by blowing in a very abundant amount of air.

3. Process for the production of compounds containing the radical of phosphoric acid by the aid of ferro-phosphorus which comprises heating ferro-phosphorus with an alkaline alkali metal compound in the presence of oxygen in amount sufficient to oxidize all of the iron of the ferro-phosphorus to oxide and at a reacting temperature below the fusion temperature of the reaction mixture and maintaining the temperature below the fusion point of the mixture, by blowing in a very abundant amount of air.

4. Process for the production of trialkali phosphate by the aid of ferro-phosphorus which comprises heating ferro-phosphorus with an alkali metal carbonate in the presence of oxygen in amount sufficient to oxidize all of the iron of the ferro-phosphorus to oxide and at a reacting temperature below the fusion temperature of the reaction mixture and maintaining the temperature below the fusion point of the mixture, by blowing in a very abundant amount of air.

In testimony whereof, we affix our signatures.

CONWAY, FREIHERR v. GIRSEWALD.
HANS WEIDMANN.